(12) United States Patent
Kagose et al.

(10) Patent No.: US 8,604,095 B2
(45) Date of Patent: Dec. 10, 2013

(54) RADIATION-CURABLE INK COMPOSITION, INK JET RECORDING METHOD, AND RECORDED MATTER

(75) Inventors: Taketoshi Kagose, Shiojiri (JP); Toshiyuki Miyabayashi, Shiojiri (JP); Satoru Miura, Matsumoto (JP); Toru Saito, Minawa-Machi (JP); Hiroki Nakane, Matsumoto (JP); Jun Ito, Shimosuwa-Machi (JP); Hiroyuki Kajimoto, Matsumoto (JP); Chigusa Sato, Shiojiri (JP); Hiroaki Kida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 12/979,750

(22) Filed: Dec. 28, 2010

(65) Prior Publication Data

US 2011/0251298 A1    Oct. 13, 2011

(30) Foreign Application Priority Data

Dec. 28, 2009   (JP) ................................. 2009-297009

(51) Int. Cl.
*C08F 2/50* (2006.01)
*C08F 8/30* (2006.01)
*B41J 2/015* (2006.01)
*B05D 1/32* (2006.01)
*C08J 7/04* (2006.01)

(52) U.S. Cl.
USPC ............... 522/26; 522/64; 522/114; 522/150; 524/555; 347/20; 427/466; 427/508

(58) Field of Classification Search
USPC ......... 522/26, 64, 114, 150; 347/20; 524/555; 427/466, 508
See application file for complete search history.

(56) References Cited

U.S. PATENT DOCUMENTS

| 7,753,514 | B2 | 7/2010 | Nakano et al. | |
| 2008/0024577 | A1* | 1/2008 | Nakano et al. | 347/102 |
| 2008/0074480 | A1* | 3/2008 | Tojo et al. | 347/100 |

FOREIGN PATENT DOCUMENTS

| JP | 2006199924 A | 8/2006 |
| JP | 2007131754 A | 5/2007 |
| JP | 20087687 A | 1/2008 |
| JP | 200935650 A | 2/2009 |

* cited by examiner

*Primary Examiner* — Michael Pepitone
*Assistant Examiner* — Jessica Roswell
(74) *Attorney, Agent, or Firm* — Nutter McClennen & Fish LLP; John J. Penny, V.

(57) ABSTRACT

A radiation-curable ink composition contains (A) aminoacrylate at 1 mass % to 10 mass %, inclusive, (B) phenoxyethyl acrylate at 20 mass % to 50 mass %, inclusive, and (C) tetraethylene glycol diacrylate at 1 mass % to 20 mass %, inclusive, in its reaction component, as well as (E) bis(2,4,6-trimethylbenzoyl)-phenylphosphine oxide at 3 parts by mass to 8 parts by mass, inclusive, (F) 2,4,6-trimethylbenzoyl-diphenyl-phosphine oxide at 3 parts by mass to 5 parts by mass, inclusive, in 100 parts by mass of the reaction component, and (G) diethylthioxanthone at 1 part by mass to 3 parts by mass, inclusive, in 100 parts by mass of the reaction component.

5 Claims, 2 Drawing Sheets

RADIATION-CURABLE INK COMPOSITION, INK JET RECORDING METHOD, AND RECORDED MATTER

CROSS REFERENCES TO RELATED APPLICATIONS

The entire disclosure of Japanese Patent Application No. 2009-297009, filed on Dec. 28, 2009 is expressly incorporated by reference herein.

TECHNICAL FIELD

The present invention relates to a radiation-curable ink composition as well as to an ink jet recording method and recorded matter based on the ink composition.

BACKGROUND ART

Recently, the development of radiation-curable ink, which is cured by irradiation with ultraviolet light, electron beams, or any other kind of radiation, has been advanced. When radiation-curable ink is used to record information on ink-repellent media, which absorb no or little ink, such as plastics, glass, and coated paper, the ink is quick to dry and allows you to record the information while avoiding ink bleed. Radiation-curable ink contains a polymerizable monomer, a polymerization initiator, a pigment and other additives, and so forth.

Incidentally, recorded matter obtained by recording an image on polyethylene terephthalate resin, vinyl chloride resin, or any other kind of flexible recoding medium may be attached to an article having curved surfaces, such as a car body. In this application, recorded matter is usually elongated before being attached to the article, and thus it is desirable that even after the recorded matter is elongated, the image recorded on the recording medium has a degree of elongation equal to or higher than 100%, no cracks or detachment, and a degree of durability high enough to withstand the elongation at such a degree.

Known types of radiation-curable inks contain, for the purpose of allowing for recording flexible images with a degree of elongation equal to or higher than 100%, a polymerizable monomer such as a long-chain alkyl acrylate, phenoxyethyl acrylate, an ethylene oxide adduct of phenoxyethyl acrylate, and an acrylic amine compound (for example, see Patent Literature 1 to 4).

And, high-energy light sources that have been commonly used, such as metal halide lamps, have problems of their short shelf life, large size, and so forth. In particular, light sources that are incorporated in ink jet recording apparatuses are required to be small in size because of the constitution of the apparatuses. Recently, as a result, light-emitting diodes (hereinafter also referred to as LEDs), a long-life and small-sized light source, have attracted attention despite their lower energy than that of metal halide lamps.

CITATION LIST

Patent Literature

PTL 1: Japanese Unexamined Patent Application Publication No. 2006-199924
PTL 2: Japanese Unexamined Patent Application Publication No. 2007-131754
PTL 3: Japanese Unexamined Patent Application Publication No. 2008-7687
PTL 4: Japanese Unexamined Patent Application Publication No. 2009-35650

SUMMARY OF THE INVENTION

Problems to be Solved by the Invention

However, even images recorded with radiation-curable ink like those mentioned above, which contains a selected polymerizable monomer, have problems; for example, when such an image is elongated together with its recording medium (e.g., at a degree of elongation of 100%) and maintained in this state, cracks occur in a few hours, and the image detaches from the recording medium. Worse yet, the recorded image is lacking in toughness and not excellent in resistance to abrasion.

Furthermore, radiation-curable ink like those mentioned above, which contains a selected polymerizable monomer, has the problem that the curing speed is seriously slow when an LED, a low-energy light source, is used as the light source. Accordingly, the development of radiation-curable ink that can be cured to a sufficient extent in recording an image on a recording medium even when a low-energy light source, such as an LED, is used has been demanded accordingly. Incidentally, it is generally preferred from the viewpoints of safety and environmental friendliness that the active radiation with which the ink is irradiated is light in the long-wavelength range, having a wavelength equal to or longer than 350 nm and generating no ozone. Additionally, it is preferred that the active radiation with which the ink is irradiated has not a continuous spectrum but a narrow peak light-emission width. The wavelength range of this peak light emission is thus preferably in the range of 350 to 400 nm.

Some aspects of the present invention provide, by solving these problems, a radiation-curable ink composition images recorded with which are excellent in flexibility, elongation durability, and resistance to abrasion and that are also excellent in curability even when a low-energy light source, such as an LED, is used.

Means for Solving the Problems

The present invention was made to solve at least a portion of these problems and can be embodied in the following aspects or exemplary applications.

[Exemplary Application 1]

An aspect of the radiation-curable ink composition according to the present invention contains:

(A) aminoacrylate at 1 mass % to 10 mass %, inclusive, in a reactive component;

(B) phenoxyethyl acrylate at 20 mass % to 50 mass %, inclusive, in the reactive component;

(C) tetraethylene glycol diacrylate at 1 mass % to 20 mass %, inclusive, in the reactive component;

(E) bis(2,4,6-trimethylbenzoyl)-phenylphosphine oxide at 3 parts by mass to 8 parts by mass, inclusive, in 100 parts by mass of the reaction component;

(F) 2,4,6-trimethylbenzoyl-diphenyl-phosphine oxide at 3 parts by mass to 5 parts by mass, inclusive, in 100 parts by mass of the reaction component; and (G) diethylthioxanthone at 1 part by mass to 3 parts by mass, inclusive, in 100 parts by mass of the reaction component.

With the radiation-curable ink composition according to Exemplary Application 1, recorded images are excellent in flexibility, elongation durability, and resistance to abrasion owing to the combination of the ingredients specified above, and it is possible to reduce the amount of energy required to cure the ink composition by irradiation with active radiation having a peak light-emission wavelength in the range of 350 to 400 nm.

[Exemplary Application 2]

Exemplary Application 1 can further contain:

(D) alicyclic-structured monofunctional acrylate at 20 mass % to 65 mass %, inclusive, in the reaction component.

[Exemplary Application 3]

In Exemplary Application 2, (D) the alicyclic-structured monofunctional acrylate can be at least one selected from dicyclopentenyl acrylate, dicyclopentanyl acrylate, and dicyclopentenyloxyethyl acrylate.

[Exemplary Application 4]

In any one of Exemplary Application 1 to Exemplary Application 3, the viscosity at a measurement temperature of 20° C. is in the range of 10 mPa·s to 40 mPa·s, inclusive, and the surface tension at a measurement temperature of 20° C. is in the range of 20 mN/m to 30 mN/m, inclusive.

[Exemplary Application 5]

An aspect of the ink jet recording method according to the present invention includes:

(a) a step of discharging the radiation-curable ink composition according to any one of Exemplary Application 1 to Exemplary Application 4 onto a recording medium and (b) a step of irradiating the discharged radiation-curable ink composition from an active-radiation light source with active radiation having a peak light-emission wavelength in the range of 350 nm to 400 nm, inclusive.

[Exemplary Application 6]

An aspect of the recorded matter according to the present invention is:

recorded by the ink jet recording method according to Exemplary Application 5.

DESCRIPTION OF THE EMBODIMENTS

The following describes some preferred embodiments of the present invention. The embodiments described below are for the purpose of providing some examples of the present invention. Furthermore, the present invention is not limited to the embodiments described below and includes various modifications that are implemented with no change made to the gist of the present invention. Note that in the present invention, an "image" represents a printed pattern consisting of a group of dots, including printed text and a solid print.

1. Radiation-Curable Ink Composition

The radiation-curable ink composition according to an embodiment of the present invention contains (A) aminoacrylate at 1 mass % to 10 mass %, inclusive, in a reactive component, (B) phenoxyethyl acrylate at 20 mass % to 50 mass %, inclusive, in the reactive component, (C) tetraethylene glycol diacrylate at 1 mass % to 20 mass %, inclusive, in the reactive component, (E) bis(2,4,6-trimethylbenzoyl)-phenylphosphine oxide at 3 parts by mass to 8 parts by mass, inclusive, relative to 100 parts by mass of the reaction component, (F) 2,4,6-trimethylbenzoyl-diphenyl-phosphine oxide at 3 parts by mass to 5 parts by mass, inclusive, relative to 100 parts by mass of the reaction component, and (G) diethylthioxanthone at 1 part by mass to 3 parts by mass, inclusive, relative to 100 parts by mass of the reaction component.

The following details the individual ingredients used in this embodiment.

1.1. Reaction Component

In the present invention, a "reaction component" represents a polymerizable monomer used to form a polymer and does not include any other additives such as pigments, dispersants, photopolymerization initiators, and slipping agents. The following details the reaction component used in this embodiment.

1.1.1. (A) Aminoacrylate

The radiation-curable ink composition according to this embodiment contains (A) aminoacrylate at 1 mass % to 10 mass %, inclusive, in its reaction component. The radiation-curable ink composition according to this embodiment allows for, by containing Ingredient (A), Ingredient (E), Ingredient (F), and Ingredient (G) in the reaction component at their specified content ratios, curing the ink composition by irradiation with active radiation having a peak light-emission wavelength in the range of 350 to 400 nm with only a reduced amount of energy needed. More specifically, it is made possible by the combination of the ingredients specified above to reduce the amount of energy required to cure the ink composition by approximately 50 to 100 mJ/cm$^2$ and to improve the curability of the ink. As a result, it becomes possible to cure the ink composition quickly even when the active radiation is applied from a low-energy light source, such as an LED. Note that in the present invention, "cure" means that recorded matter is made to feel not tacky on a finger touch, or it is made in the so-called tack-free state.

For Ingredient (A), commercially available products include, for example, EBECRYL 7100 (manufactured by DAICEL-CYTEC Company Ltd.), CN371 (manufactured by Sartomer USA, LLC), and so forth.

The content ratio of Ingredient (A) is, with the total mass of the reaction component defined as 100 mass %, in the range of 1 mass % to 10 mass %, inclusive, and preferably in the range of 1 mass % to 5 mass %, inclusive. When the content ratio of Ingredient (A) in the reaction component falls within either one or both of these ranges, it is possible to reduce the amount of energy required to cure the ink composition by irradiation with active radiation having a peak light-emission wavelength in the range of 350 to 400 nm by approximately 50 to 100 mJ/cm$^2$. When the content ratio of Ingredient (A) in the reaction component is lower than 1 mass %, it is impossible to reduce the amount of energy required to cure the ink composition by irradiation with active radiation having a peak light-emission wavelength in the range of 350 to 400 nm. When it exceeds 10 mass %, however, the viscosity of the ink composition will be high, and this may lead to a reduced discharge stability of the ink in an ink jet recording apparatus; worse yet, the images recorded on recording media with this ink composition may yellow.

1.1.2. (B) Phenoxyacrylate

The radiation-curable ink composition according to this embodiment contains (B) phenoxyacrylate at 20 mass % to 50 mass %, inclusive, in its reaction component. The radiation-curable ink composition according to this embodiment offers, by containing Ingredient (B), improved flexibility and elongation durability of the images recorded on recording media therewith.

In addition to this, Ingredient (B) serves as a solvent to dissolve Ingredient (E), Ingredient (F), and Ingredient (G) (described later). In particular, Ingredient (E), which is a photopolymerization initiator relatively insoluble in solvent, can be certainly dissolved when Ingredient (B) is contained at its specified content ratio.

Furthermore, Ingredient (B) can dilute other acrylate monomers well; it has no inhibitory effect on the function of Ingredient (A) (described above) or those of Ingredient (C) and Ingredient (D) (described later).

The content ratio of Ingredient (B) is, with the total mass of the reaction component defined as 100 mass %, in the range of 20 mass % to 50 mass %, inclusive, and preferably in the range of 25 mass % to 40 mass %, inclusive. When the content ratio of Ingredient (B) in the reaction component falls within either one or both of these ranges, the images recorded on recording media with the ink composition will be flexible, have a high degree of elongation, have no cracks or detachment even when they are elongated together with their recording medium and maintained in that state. When the content ratio of Ingredient (B) in the reaction component is lower than 20 mass %, the images recorded on recording media will have a reduced degree of elongation, cracks and detachment will often occur on the images, and the elongation durability of the images will be seriously low; worse yet, Ingredient (E) (described later) cannot be completely dissolved in the ink composition in some cases. When it exceeds 50 mass %, however, the resistance of the images recorded on recording media to abrasion and weathering will possibly be low.

1.1.3. (C) Tetraethylene Glycol Diacrylate

The radiation-curable ink composition according to this embodiment contains (C) tetraethylene glycol diacrylate at 1 mass % to 20 mass %, inclusive, in its reaction component. The radiation-curable ink composition according to this embodiment can be, by containing (C) the tetraethylene glycol diacrylate, cured by irradiation with active radiation having a peak light-emission wavelength in the range of 350 to 400 nm with the required amount of energy reduced by approximately 50 to 100 $mJ/cm^2$.

Furthermore, the radiation-curable ink composition according to this embodiment is, by containing Ingredient (B) at 20 mass % to 50 mass %, inclusive, in its reaction component, excellent in the flexibility of the images recorded on recording media therewith, as mentioned above. (C) The tetraethylene glycol diacrylate functions as a cross-linker for maintaining the flexibility of the images recorded on recording media and enhancing the strength of the images. This makes it possible to give toughness to the images recorded on recording media and improve their resistance to abrasion. Moreover, (C) tetraethylene glycol diacrylate can dilute other acrylate monomers well; it has no inhibitory effect on the functions of Ingredient (A) and Ingredient (B).

The content ratio of (C) the tetraethylene glycol diacrylate is, with the total mass of the reaction component defined as 100 mass %, in the range of 1 mass % to 20 mass %, inclusive, and preferably in the range of 10 mass % to 20 mass %, inclusive. When the content ratio of (C) the tetraethylene glycol diacrylate in the reaction component is lower than 1 mass %, it is impossible to reduce the amount of energy required to cure the ink composition by irradiation with active radiation having a peak light-emission wavelength in the range of 350 to 400 nm; worse yet, the images recorded on recording media with the ink composition will often be poor in resistance to abrasion. When it exceeds 20 mass %, however, the images recorded on recording media will not be excellent in flexibility, and cracks and detachment will often occur on the images recorded on recording media; worse yet, the viscosity of the radiation-curable ink composition will be high, and this will often make clogging and other defects in the nozzles of an ink jet printer more likely to occur.

1.1.4. (D) Alicyclic-Structured Monofunctional Acrylate

The radiation-curable ink composition according to this embodiment may contain (D) an alicyclic-structured monofunctional acrylate at 20 mass % to 65 mass %, inclusive, in its reaction component. The radiation-curable ink composition according to this embodiment can have, by containing (D) the alicyclic-structured monofunctional acrylate, a viscosity regulated down to a low value suitable for ink jet recording (20° C.; not lower than 10 mPa·s, not higher than 40 mPa·s). This is because monofunctional acrylates generally have a low viscosity. Furthermore, with its bulky alicyclic structure, (D) the alicyclic-structured monofunctional acrylate gives toughness to the images recorded on recording media with the ink composition and improves their resistance to abrasion. The use of an alicyclic-structured monofunctional acrylate, not aromatic one, also leads to improved resistance to weathering. Moreover, (D) the alicyclic-structured monofunctional acrylate can dilute other acrylate monomers well; it has no inhibitory effect on the functions of Ingredient (A), Ingredient (B), and Ingredient (C).

Examples of (D) the alicyclic-structured monofunctional acrylate includes, for example, dicyclopentenyloxyethyl acrylate, dicyclopentenyl acrylate, dicyclopentanyl acrylate, isobornyl acrylate, trimethylolpropane formal monoacrylate, adamantyl acrylate, oxetane acrylate, 3,3,5-trimethyl cyclohexane acrylate, and so forth. These polymerizable monomers may be used singly or in combination of two or more kinds.

The content ratio of (D) the alicyclic-structured monofunctional acrylate is, with the total mass of the reaction component defined as 100 mass %, preferably in the range of 20 mass % to 65 mass %, inclusive. When the content ratio of (D) the alicyclic-structured monofunctional acrylate in the reaction component is lower than 20 mass %, the images recorded on recording media with the ink composition will often have low resistance to abrasion. When it exceeds 65 mass %, however, the images recorded on recording media will often not be excellent in flexibility, and cracks and detachment will often occur on the images recorded on recording media.

1.2. Photopolymerization Initiator/Photosensitizer

The radiation-curable ink composition according to this embodiment contains the photopolymerization initiator and photosensitizer described below. The radiation-curable ink composition according to this embodiment gives, by containing the photopolymerization initiator and the photosensitizer described below at their specified content ratios, enhanced curability to the images recorded on recording media therewith.

1.2.1. (E) Bis(2,4,6-Trimethylbenzoyl)-Phenylphosphine Oxide

The radiation-curable ink composition according to this embodiment contains (E) bis(2,4,6-trimethylbenzoyl)-phenylphosphine oxide at 3 parts by mass to 8 parts by mass, inclusive, in 100 parts by mass of the reaction component. Ingredient (E) is a molecular-cleavage-type photopolymerization initiator having broad-spectrum light absorption properties; it releases radicals through molecular cleavage upon exposure to active radiation having a peak light-emission wavelength in the range of 350 to 400 nm.

Ingredient (E) greatly changes the structure of its chromophores and shows a great shift in absorbance before and after the molecular cleavage induced by the absorption of active radiation; as a result, a decrease in absorbance called photobleaching is observed. Furthermore, Ingredient (E) hardly yellows and is excellent in internal curability despite that the absorption of active radiation ranges from the UV region to the VL region. This means that Ingredient (E) is particularly advantageous to use in transparent and thick films as well as in pigmented and highly hiding coatings. The radiation-curable ink composition according to this embodiment allows, by combining Ingredient (E), Ingredient (F), and Ingredient (G), Ingredient (E) to exercise its photobleaching effect more efficiently.

For Ingredient (E), commercially available products include, for example, IRGACURE 819 (manufactured by Ciba Japan K.K.) and so forth.

The content ratio of Ingredient (E) is in the range of 3 parts by mass to 8 parts by mass, inclusive, and preferably in the range of 5 parts by mass to 8 parts by mass, inclusive, in 100 parts by mass of the reaction component. When the content ratio of Ingredient (E) is lower than 3 parts by mass, the images recorded on recording media with the ink composition will often be poor in curability. When it exceeds 8 parts by mass, however, there arises the problem that Ingredient (E) is not completely dissolved in the reaction component and separates out; worse yet, the images recorded on recording media may yellow.

1.2.2. (F)
2,4,6-Trimethylbenzoyl-Diphenyl-Phosphine Oxide

The radiation-curable ink composition according to this embodiment contains (F) 2,4,6-trimethylbenzoyl-diphenyl-phosphine oxide at 3 parts by mass to 5 parts by mass, inclusive, in 100 parts by mass of the reaction component. Ingredient (F) is a molecular-cleavage-type photopolymerization initiator that has better solubility in the reaction component than Ingredient (E) and thus can be easily incorporated in the design of the formulation. Ingredient (F) has, as with Ingredient (E), a photobleaching effect, and is particularly advantageous to use in transparent and thick films as well as in pigmented and highly hiding coatings.

For Ingredient (F), commercially available products include, for example, DAROCUR TPO (manufactured by Ciba Japan K.K.) and so forth.

The content ratio of Ingredient (F) is in the range of 3 parts by mass to 5 parts by mass, inclusive, and preferably in the range of 4 parts by mass to 5 parts by mass, inclusive, in 100 parts by mass of the reaction component. When the content ratio of Ingredient (F) is lower than 3 parts by mass, the images recorded on recording media with the ink composition will often be poor in curability. When it exceeds 5 parts by mass, however, no improvement will be observed in the effect; such an excessively large amount of Ingredient (F) is unfavorable.

1.2.3. (G) Diethylthioxanthone

The radiation-curable ink composition according to this embodiment contains (G) diethylthioxanthone at 1 part by mass to 3 parts by mass, inclusive, in 100 parts by mass of the reaction component. Ingredient (G) functions as a photosensitizer by receiving energy from radiation and then giving it to the reaction component and other substances involved.

For Ingredient (G), commercially available products include, for example, DETX (manufactured by NIPPON KAYAKU Co., Ltd.) and so forth.

The content ratio of Ingredient (G) is in the range of 1 part by mass to 3 parts by mass, inclusive, in 100 parts by mass of the reaction component. When the content ratio of Ingredient (G) is lower than 1 part by mass, the images recorded on recording media with the ink composition will often be poor in curability. When it exceeds 3 parts by mass, however, no improvement will be observed in the effect; such an excessively large amount of Ingredient (F) is unfavorable. Worse yet, in the latter case, the images recorded on recording media may yellow.

1.3. Other Additives

Besides the reaction component described above, the radiation-curable ink composition according to this embodiment may further contain other reaction components as well as pigments, dispersants, slipping agents, polymerization inhibitors, and other kinds of additives if necessary.

However, the radiation-curable ink composition according to the present invention preferably contains no organic solvent; it is preferably a solventless radiation-curable ink composition.

As for reaction components other than the one described above, preferred ones include, for example, acrylate monomers having a glass transition temperature equal to or lower than 0° C. such as those listed below. The reason why such acrylate monomers are preferable is that they do not affect the flexibility or elongation durability of the images recorded on recording media with the ink composition.

<Long-Chain Alkyl Acrylates>

Long-chain alkyl acrylates include, for example, 2-ethyl hexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, isostearyl acrylate, and so forth.

<Polyethylene Oxides or Polypropylene Oxide Adducts of Monofunctional Acrylates>

Polyethylene oxides or polypropylene oxide adducts of monofunctional acrylates include, for example, (poly)ethylene glycol monoacrylate, (poly)ethylene glycol acrylate methyl ester, (poly)ethylene glycol acrylate ethyl ester, (poly)ethylene glycol acrylate phenyl ester, (poly)propylene glycol monoacrylate, (poly)propylene glycol monoacrylate phenyl ester, (poly)propylene glycol acrylate methyl ester, (poly)propylene glycol acrylate ethyl ester, methoxytriethylene glycol acrylate, methoxydipropylene glycol acrylate, ethoxydiethylene glycol acrylate, methoxy-polyethylene glycol acrylate, and so forth.

<Modified Phenoxyethyl Acrylates>

Modified phenoxyethyl acrylates include, for example, phenoxydiethylene glycol acrylate, phenoxy-polyethylene glycol acrylate, 2-hydroxy-3-phenoxypropyl acrylate, nonyl phenol EO adducts of acrylates, and so forth.

For the reaction components other than the one described above, another group of preferred ones includes, for example, acrylate monomers containing nitrogen atoms, such as N-vinyl caprolactam, N-vinyl pyrrolidone, and acryloyl morpholine. Acrylate monomers containing nitrogen atoms like those listed above improve the adhesion of the images recorded on recording media with the ink composition to their own recording medium.

To the radiation-curable ink composition according to this embodiment, which is ready to function as so-called clear ink as it is, may be added a pigment. Examples of the pigments that can be used in this embodiment include, but not particularly limited to, inorganic pigments and organic pigments. Examples of the inorganic pigments that can be used here include, in addition to titanium oxide and iron oxide, carbon blacks produced by the contact method, furnace method, thermal method, or any other known method. On the other hand, examples of the organic pigments that can be used here include azo pigments (azo lakes, insoluble azo pigments, condensed azo pigments, and chelate azo pigments included), polycyclic pigments (e.g., phthalocyanine pigments, perylene pigments, perinone pigments, anthraquinone pigments, and quinophthalone pigments), nitro pigments, nitroso pigments, aniline blacks, and so forth.

As for carbon black pigments, a specific example of those that can be used in this embodiment is C.I. Pigment Black 7. It is commercially available from Mitsubishi Chemical Corporation under the names of No. 2300, No. 900, MCF88, No. 33, No. 40, No. 45, No. 52, MA7, MA8, MA100, No. 2200B, and so forth, from Columbian Chemicals Company as the Raven series including Raven 5750, 5250, 5000, 3500, 1255, and 700 and under other names, from Cabot Corporation as the Regal series including Regal 400R, 330R, and 660R, the MOGUL series including Mogul L and 700, the Monarch series including Monarch 800, 880, 900, 1000, 1100, 1300, and 1400, and under other names, and from Degussa GmbH as the COLOR BLACK FW series including COLOR BLACK FW 1, FW 2, FW 2V, FW 18, and FW 200, the COLOR BLACK S series including COLOR BLACK S 150, S 160, and S 170, the PRINTEX series including PRINTEX 35, U, and V, the SPECIAL BLACK series including SPECIAL BLACK 6, 5, 4A, and 4, and under other names.

As for the pigments that can be used to produce the radiation-curable ink composition according to the present invention as yellow ink, examples include C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, 213, and so forth.

As for the pigments that can be used to produce the radiation-curable ink composition according to the present invention as magenta ink, examples include C.I. Pigment Red 5, 7, 12, 48 (Ca), 48 (Mn), 57 (Ca), 57:1, 112, 122, 123, 168, 184, 202, and 209, C.I. Pigment Violet 19, and so forth.

As for the pigments that can be used to produce the radiation-curable ink composition according to the present invention as cyan ink, examples include C.I. Pigment Blue 1, 2, 3, 15:3, 15:4, 16, 22, 60, and so forth.

As for the pigments that can be used to produce the radiation-curable ink composition according to the present invention as green ink, examples include C.I. Pigment Green 7, 8, 36, and so forth.

As for the pigments that can be used to produce the radiation-curable ink composition according to the present invention as orange ink, examples include C.I. Pigment Orange 51, 66, and so forth.

As for the pigments that can be used to produce the radiation-curable ink composition according to the present invention as white ink, examples include basic lead carbonate, zinc oxide, titanium oxide, strontium titanate, and so forth.

As for the pigments that can be used in this embodiment, the average particle diameter is preferably in the range of 10 nm to 200 nm and more preferably in the range of 50 nm to 150 nm.

For the pigments that can be added to the radiation-curable ink composition according to the present invention, the amount of the pigment used is preferably in the range of 0.1 part by mass to 25 parts by mass and more preferably in the range of 0.5 part by mass to 15 parts by mass in 100 parts by mass of the reaction component.

To the radiation-curable ink composition according to this embodiment may be further added a dispersant for the purpose of improving the dispersion of the pigment described above. Examples of the dispersants that can be used in this embodiment include Solsperse 3000, 5000, 9000, 12000, 13240, 17000, 24000, 26000, 28000, and 36000 (all manufactured by The Lubrizol Corporation), Discole N-503, N-506, N-509, N-512, N-515, N-518, and N-520 (all manufactured by Dai-Ichi Kogyo Seiyaku Co., Ltd.), and other polymer dispersants.

To the radiation-curable ink composition according to this embodiment may be added a slipping agent. A preferred example of the slipping agents that can be used in this embodiment is silicone-based surfactants, and more preferred ones are polyester-modified silicone and polyether-modified silicone. Specific examples of polyester-modified silicone include BYK-347, BYK-348, BYK-UV 3500, BYK-UV 3510, and BYK-UV 3530 (all manufactured by BYK Japan KK) and so forth, and those of polyether-modified silicone include BYK-3570 (manufactured by BYK Japan KK) and so forth.

To the radiation-curable ink composition according to this embodiment may be added a polymerization inhibitor.

Examples of the polymerization inhibitors that can be used in this embodiment include hydroquinone, benzoquinone, p-methoxyphenol, and so forth.

1.4. Physical Properties

The viscosity of the radiation-curable ink composition according to this embodiment at 20° C. is preferably in the range of 10 to 40 mPa·s and more preferably in the range of 15 to 25 mPa·s. When the viscosity of the radiation-curable ink composition at 20° C. falls within either one or both of these ranges, the radiation-curable ink composition can be discharged from nozzles in an appropriate amount and is further prevented from travelling in random directions and spattering; the ink composition can be suitably used in an ink jet recording apparatus. In addition, the viscosity can be measured in Pysica MCR-300 rheometer by increasing the shear rate from 10 to 1000 while maintaining the environment at 20° C., and reading the viscosity at a shear rate of 200.

The surface tension of the radiation-curable ink composition according to this embodiment at 20° C. is preferably in the range of 20 mN/m to 30 mN/m, inclusive. When the surface tension of the radiation-curable ink composition according to this embodiment at 20° C. falls within this range, the radiation-curable ink composition hardly wets liquid-repellent nozzles. As a result, the radiation-curable ink composition can be discharged from nozzles in an appropriate amount and is further prevented from travelling in random directions and spattering; the ink composition can be suitably used in an ink jet recording apparatus. In addition, the surface tension can be measured in CBVP-Z automatic surface tensiometer (manufactured by Kyowa Interface Chemistry Co., Ltd.) by wetting a platinum plate with the ink while maintaining the environment at 20° C., and monitoring the surface tension during this process.

2. Ink Jet Recording Method

The ink jet recording method according to an embodiment of the present invention includes (a) a step of discharging the radiation-curable ink composition described above onto a recording medium and (b) a step of irradiating the discharged radiation-curable ink composition from an active-radiation light source with active radiation having a peak light-emission wavelength in the range of 350 nm to 400 nm, inclusive.

The following describes the ink jet recording method according to this embodiment step by step.

2.1. Step (a)

This step is a step of discharging the above-described radiation-curable ink composition onto a recording medium.

For the radiation-curable ink composition, the preceding description applies; the detailed explanation of it is omitted here.

Examples of the recording medium include, but are not particularly limited to, polyvinyl chloride, polyethylene terephthalate, polypropylene, polyethylene, polycarbonate, and other plastics, surface-treated plastic materials, glass, coated paper, and so forth.

Means for discharging the radiation-curable ink composition include, for example, the ink jet recording apparatus described below.

Figure 1:
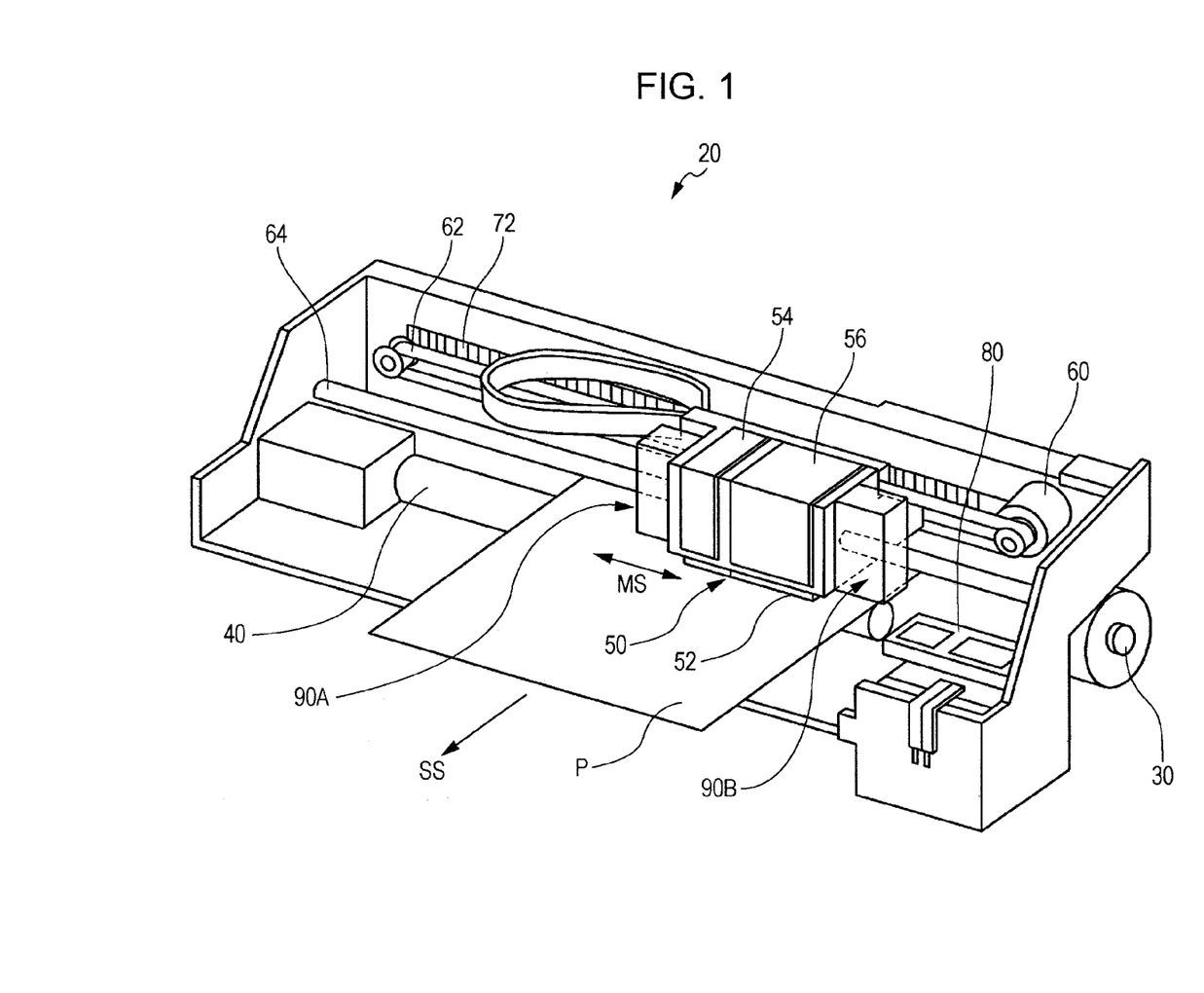
FIG. 1 is a perspective view of an ink jet recording apparatus that can be used in the ink jet recording method according to this embodiment.

FIG. 1 is a perspective view of an ink jet recording apparatus that can be used in the ink jet recording method according to this embodiment.

The ink jet recording apparatus 20 illustrated in FIG. 1 has a motor 30 for feeding a recording medium P in the sub-scanning direction SS, a platen 40, a printing head 52 as a recording head for shaping the radiation-curable ink composition into particles having a very small diameter and then ejecting the particles from head nozzles to discharge them onto the recording medium P, a carriage 50 that carries the printing head 52, a carriage motor 60 for moving the carriage 50 in the main scanning direction MS, and a pair of active-radiation applicators 90A and 90B for irradiating the recording medium P on its ink-retaining surface, onto which the printing head 52 has discharged the radiation-curable ink composition, with active radiation.

The carriage 50 is pulled on a traction belt 62, which is driven by the carriage motor 60, to move along a guide rail 64.

The printing head 52 illustrated in FIG. 1 is a full-color printing serial-type head that can eject inks of three or more colors, and it has many head nozzles for each color. The carriage 50, which carries this printing head 52, has, in addition to the printing head 52, a black cartridge 54 as a black ink container that contains black ink to supply it to the printing head 52, and a color ink cartridge 56 as color ink that contains color ink to supply it to the printing head 52. The ink contained in each of the cartridges 54 and 56 is the radiation-curable ink composition described above.

A capping unit 80 is situated at the home position of the carriage 50 (a position on the right side of FIG. 1), and it seals the nozzle-holding surface of the printing head 52 at standstill. When a printing job finishes and the carriage 50 comes over this capping unit 80, a mechanism not illustrated in the drawing automatically lifts the capping unit 80, and the nozzle-holding surface of the printing head 52 is sealed. Capping the printing head 52 in this way prevents the ink contained in the nozzles from drying. The positional control of the carriage 50 is performed for the purpose of, for example, positioning the carriage 50 accurately in the position of this capping unit 80.

The use of an ink jet recording apparatus 20 constituted as above allows you to discharge the radiation-curable ink composition onto a recording medium. Furthermore, the ink jet recording apparatus 20 also makes it possible to perform Step (a) and Step (b) continuously in a single apparatus, with no separate apparatuses for Step (a) and Step (b) needed.

2.2. Step (b)

This step is a step of irradiating the discharged radiation-curable ink composition from an active-radiation light source with active radiation having a peak light-emission wavelength in the range of 350 nm to 400 nm, inclusive. In this step, the radiation-curable ink composition that has been discharged onto a recording medium is irradiated with active radiation having a specified wavelength and cured, so that an image can be recorded on the recording medium.

The following details Step (b) performed using the ink jet recording apparatus 20 described above.

Figure 2:
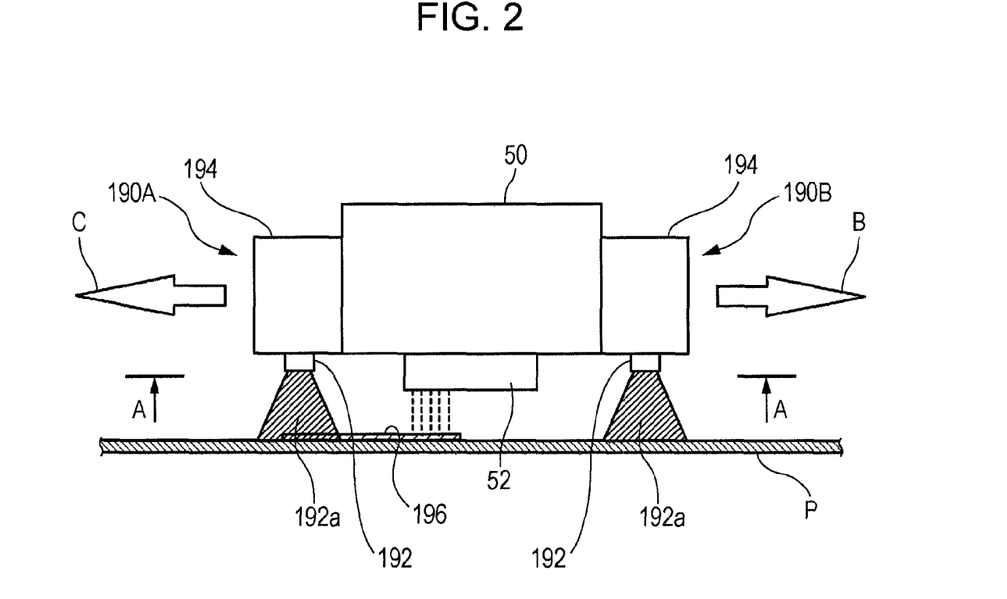
FIG. 2 is a front view of the active-radiation applicators illustrated in FIG. 1.
Figure 3:
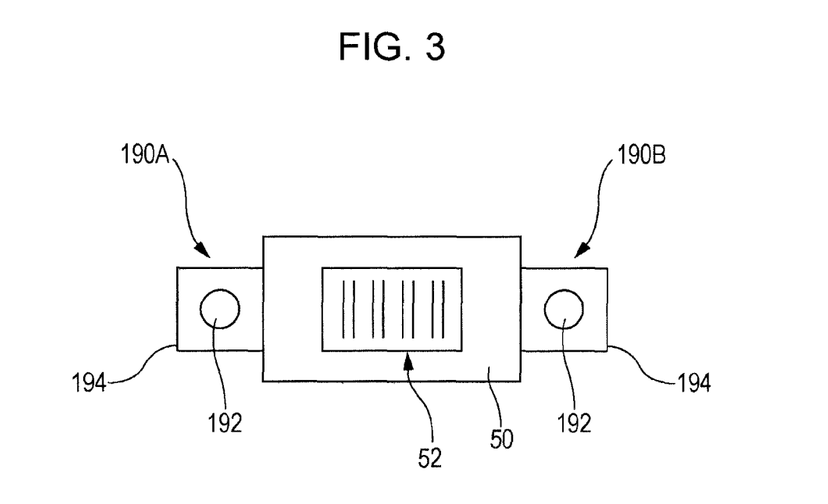
FIG. 3 is an external view of FIG. 2 seen from line A-A.

FIG. 2 is a front view of the active-radiation applicators 90A and 90B illustrated in FIG. 1. (The numeral 90A corresponds to 190A in FIGS. 2, and 90B corresponds to 190B in FIG. 2.) FIG. 3 is an external view of FIG. 2 seen from line A-A.

As illustrated in FIG. 1 to FIG. 3, the active-radiation applicators 190A and 190B are situated on both lateral sides of the carriage 50 in line with the direction of travel of the carriage 50.

As illustrated in FIG. 2, the active-radiation applicator 190A, which is situated on your left-hand side of the printing head 52, applies active radiation to an ink layer 196, which has been discharged onto the recording medium P, during rightward scanning, or while the carriage 50 is moving to the right (in the direction of Arrow B in FIG. 2). On the other hand, the active-radiation applicator 190B, which is situated on your right-hand side of the printing head 52, applies active radiation to the ink layer 196, which has been discharged onto the recording medium P, during leftward scanning, or while the carriage 50 is moving to the left (in the direction of Arrow C in FIG. 2).

The active-radiation applicators 190A and 190B each have a housing 194 situated on the carriage 50 and holding one active-radiation light source 192 arranged in line with the one on the other side, and a light-source-controlling circuit (not illustrated in the drawing) for controlling the active-radiation light source 192 to turn on and off. Although the active-radiation applicators 190A and 190B have one active-radiation light source 192 each as illustrated in FIG. 2 and FIG. 3, they may have two or more. It is preferable to use either LEDs or LDs as the active-radiation light sources 192. By doing so, or not using mercury lamps, metal halide lamps, or any similar kind of lamps as the active-radiation light sources 192, you can avoid the situation where the active-radiation light sources have a large size due to filters and other components. Furthermore, the output intensity of active radiation is not reduced by the absorption into filters, and the radiation-curable ink composition can be efficiently cured.

Moreover, the active-radiation light sources 192 may have the same output wavelength or different output wavelengths. When LEDs or LDs are used as the active-radiation light sources 192, the only requirement is that the peak light-emission wavelength of the output active radiation must be in or near the range of 350 to 400 nm.

With these active-radiation applicators 190A and 190B, the ink layer 196, which has been discharged from the printing head 52 and adhered to the recording medium P, can be irradiated with the active radiation 192a emitted from the active-radiation light sources 192 for irradiating downward the recording medium P while the recording medium P is near the printing head 52, and the surface and the inside of the ink layer 196 can be cured.

The irradiance of the active radiation should be changed depending on the thickness of the ink layer 196, which has adhered to the recording medium P, and cannot be strictly specified; favorable conditions should be appropriately chosen. Since the radiation-curable ink composition described above is used, however, an ultraviolet irradiance on the order of 300 to 1000 mJ/cm$^2$ is enough to cure the ink layer 196.

The ink jet recording apparatus 20 makes it possible to effectively cure several kinds of radiation-curable ink compositions discharged onto a recording medium P while avoiding ink bleed and mixed colors even in full-color printing, in which the radiation-curable ink compositions have a low viscosity and the thickness of the ink layer is relatively small.

In addition, the constitution of the ink jet recording apparatus 20 is not limited to the one described above, which includes a recording head, a carriage, active-radiation light sources, and other components, and various modifications can be used within the gist of the ink jet recording method according to this embodiment.

3. Recorded Matter

The recorded matter according to an embodiment of the present invention is a record made using the ink jet recording method described above. The image recorded on a recording medium is formed using the radiation-curable ink composition described above; thus, it is excellent in flexibility and elongation durability and can be cured by irradiation with active radiation having a peak light-emission wavelength in the range of 350 to 400 nm with only a reduced amount of energy needed.

The applications of the recorded matter according to this embodiment is not particularly limited; it can be used as the above-mentioned image recorded on a recording medium. The image recorded on a recording medium is excellent in flexibility and elongation durability and also excellent in curability and resistance to abrasion, and thus it is particularly suitable for applications in which images are attached to articles of which ease of processing by bending or drawing is demanded.

4. Examples

The following more specifically describes the present invention with reference to examples; however, the present invention is not limited to these examples.

4.1. Preparation of Pigment Dispersion

To 15 parts by mass of a cyan pigment (available from Ciba Japan K.K. under the trade name of IRGALITE BLUE GLVO) as a coloring agent and 1.2 parts by mass of Solsperse 36000 (manufactured by The Lubrizol Corporation) as a dispersant, phenoxyethyl acrylate (available from Osaka Organic Chemical Industry Ltd. under the trade name of V#192) was added to make the total amount 100 parts by weight. The ingredients were blended by stirring to form a mixture. This mixture, together with zirconia beads (diameter: 1.5 mm), was subjected to a six-hour dispersion treatment in a sand mill (manufactured by Yasukawa Seisakusho K.K.). Then, the zirconia beads were isolated using a separator. In this way, a cyan pigment dispersion for Examples and Comparative Examples was obtained.

4.2. Preparation of Radiation-Curable Ink Compositions

A reaction component, a photopolymerization initiator, a slipping agent, and a polymerization inhibitor were blended in accordance with the formulations specified in Table 1 or Table 2 and completely dissolved. To this solution, the cyan pigment dispersion prepared above was dripped until the concentration of the cyan pigment reached that specified in Table 1 or Table 2 while the solution was being stirred. After the completion of the dripping, the ingredients were blended by stirring for one hour at atmospheric temperature, and the obtained solution was filtered through a 5-μm membrane filter. In this way, the individual radiation-curable ink compositions were obtained.

In addition, the ingredients mentioned in the tables were as follows:

Phenoxyacrylate (Osaka Organic Chemical Industry Ltd.; trade name: V#192)—Dicyclopentenyloxyethyl acrylate (available from Hitachi Chemical Co., Ltd. under the trade name of FA512AS)

Dicyclopentenyl acrylate (available from Hitachi Chemical Co., Ltd. under the trade name of FA511AS)

Dimethylol tricyclodecane diacrylate (available from DAICEL-CYTEC Company Ltd. under the trade name of EBECRYL IRR214K)

N-vinyl caprolactam (available from BASF Corporation under the trade name of N-vinyl Caprolactam)—Tetraethylene glycol diacrylate (available from Osaka Organic Chemical Industry Ltd. under the trade name of V#335)

Aminoacrylate (available from DAICEL-CYTEC Company Ltd. under the trade name of EBECRYL 7100)

IRGACURE 819 (bis(2,4,6-trimethylbenzoyl)-phenylphosphine oxide, a photopolymerization initiator, manufactured by Ciba Japan K.K.)

DAROCUR TPO (2,4,6-trimethylbenzoyl-diphenyl-phosphine oxide, a photopolymerization initiator, manufactured by Ciba Japan K.K.)

DETX (a photosensitizer manufactured by NIPPON KAYAKU Co., Ltd.)

BYK-UV 3500 (a polyether-modified acrylic polydimethylsiloxane, a slipping agent, manufactured by BYK Japan KK)

p-methoxyphenol (a polymerization inhibitor manufactured by Kanto Chemical Co., Inc.)

IRGALITE BLUE GLVO (a cyan pigment manufactured by Ciba Japan K.K.)—Solsperse 36000 (a dispersant manufactured by The Lubrizol Corporation)

4.3. Production of Recorded Matter

The radiation-curable ink compositions were individually filled in lines of nozzles using PX-G5000 ink jet printer (manufactured by Seiko Epson Corp.). At atmospheric temperature and under atmospheric pressure, a solid pattern image was printed on a PVC film (available from Sumitomo 3M Limited under the trade name of IJ180Cv3-10) with the dot diameter of ink set at Chu-Dotto (medium dots) and the target thickness of the print (ink layer) at 10 μm, and this solid pattern image was cured by irradiation with two wavelengths of ultraviolet light, 365 nm and 395 nm, from UV-LEDs situated in the ultraviolet applicators fit to the lateral sides of the carriage with the irradiance set at 60 mW/cm$^2$ for both the wavelengths. In this way, recorded matter consisting of a PVC film and a solid pattern image printed on this film was produced. In addition, in the evaluation tests other than that in 4.4.1. Evaluation of Curability, curing treatment was performed using curing conditions under which the integrated light intensity was 400 mJ/cm$^2$.

4.4. Evaluation Tests

The obtained sheets of recorded matter were subjected to the following evaluation tests. The following evaluation tests were all conducted under room temperature conditions.

4.4.1. Evaluation of Curability

Recorded matter consisting of a PVC film and a solid pattern image printed on this film was produced in the same way as in 4.3. Production of Recorded Matter above. The integrated light intensity required to get the surface of this recorded matter into the tack-free state was determined, and the curability was evaluated on the basis of the result. For the judgment of whether the tack-free state was reached or not, the surface of the recorded matter was rubbed with a cotton swab. When the recorded matter had no scratches both on its surface and in its depths, it was judged to be in the tack-free state. The evaluation criteria used and the corresponding grades are as follows:

A: The integrated light intensity was smaller than 200 mJ/cm$^2$.

B: The integrated light intensity was in the range of ≥200 mJ/cm$^2$ to <300 mJ/cm$^2$.

C: The integrated light intensity was in the range of ≥300 mJ/cm$^2$ to <400 mJ/cm$^2$.

D: The integrated light intensity was equal to or greater than 400 mJ/cm$^2$.

4.4.2. Evaluation of Flexibility

First, the recorded matter prepared above was cut into a specified size (the resultant length was defined as $L_0$) and set in a tensile testing machine (manufactured by A&D Company, Ltd.). With the tension rate of the tensile testing machine set at 100 mm/min, the recorded matter was elongated by the tensile testing machine, and the elongated recorded matter was visually inspected at the time point when cracks or detachment (hereinafter, collectively referred to as cracks etc.) appeared. The length of the elongated recorded matter was calculated from the length of time from the start of elongation to the onset of cracks etc.; this length was defined as $L_1$. The degree of elongation (%) at which cracks etc. appeared on the image formed on the PVC film was calculated using Formula (I) below, and the flexibility of the recorded matter was evaluated on the basis of the result.

$$\text{Degree of elongation (\%) at which cracks etc. appeared on the image} = \{(L_1-L_0)/L_0\} \times 100 \quad (1)$$

The evaluation criteria used and the corresponding grades are as follows:

AAA: The degree of elongation was equal to or higher than 180%.

AA: The degree of elongation was in the range of ≥160% to <180%.

A: The degree of elongation was in the range of ≥140% to <160%.

B: The degree of elongation was in the range of ≥20% to <140%.

C: The degree of elongation was in the range of ≥100% to <120%.

D: The degree of elongation was lower than 100%.

4.4.3. Evaluation of Elongation Durability

First, the recorded matter prepared above was cut into a specified size (the resultant length was defined as $L_0$) and elongated until the degree of elongation was 100% (the resultant length was defined as $L_2$). Then, this recorded matter, which was in the 100%-elongation state, was held on a specified jig, the length of time from the start of hold to the onset of cracks etc. was measured, and the elongation durability of the recorded matter was evaluated on the basis of the result. "The degree of elongation was 100%" here means that the following relation was satisfied: Degree of elongation (%)={($L_2$−$L_0$)/$L_0$}×100=100. The evaluation criteria used and the corresponding grades are as follows:

A: Cracks etc. were observed on the image after 84 hours of retention.

B: Cracks etc. were observed on the image after 36 hours of retention.

C: Cracks etc. were observed on the image after 24 hours of retention.

D: Cracks etc. appeared on the image at the time of 100% elongation.

4.4.4. Evaluation of Resistance to Abrasion

The images recorded on PVC films were evaluated for resistance to abrasion in accordance with JIS K5600-5-10 (Testing methods for paints—Part 5: Mechanical property of film—Section 10: Abrasion resistance (Reciprocating test panel method)). The evaluation criteria used and the corresponding grades are as follows:

1: The image had no scratches on its surface.

2: The image had less than five scratches on its surface.

3: The image had five to ten scratches on its surface.

4: The image had scratches distributed over half the area of its surface.

5: The image had scratches distributed over the whole area of its surface.

4.4.5. Evaluation of Adhesiveness

The images were evaluated for adhesiveness to the PVC film or PET film in accordance with JIS K5600-5-6 (Testing methods for paints—Part 5: Mechanical property of film—Section 6: Adhesion test (Cross-cut test)). The evaluation criteria used and the corresponding grades are as follows:

0: All the cut edges were perfectly smooth, and no detachment was observed on any square of the grid.

1: The coating had slightly detached at the points of intersection of the cuts.

2: The coating had detached along the cut edges and/or at the points of intersection.

3: The portion of the coating extending along the cut edges had seriously detached at some points or over the full length, and/or several portions of one or more squares had partially or completely detached.

4: The portion of the coating extending along the cut edges had seriously detached at some points or over the full length, and/or a number of squares had partially or completely detached.

5: The seriousness of detachment exceeded that specified in Grade 4.

4.5. Evaluation Results

The results from these evaluation tests are all summarized in Table 1 and Table 2.

TABLE 1

| | | Name of ingredient | Example 1 | Example 2 | Example 3 | Example 4 | Example 5 | Example 6 |
|---|---|---|---|---|---|---|---|---|
| Reaction component | Ingredient (A) (mass %) | Aminoacrylate | 4.6 | 1.0 | 5.0 | 4.0 | 4.0 | 4.6 |
| | Ingredient (B) (mass %) | Phenoxyethyl acrylate | 33.3 | 34.9 | 33.1 | 38.3 | 29.6 | 33.3 |
| | Ingredient (C) (mass %) | Tetraethylene glycol diacrylate | 11.2 | 11.2 | 11.2 | 1.0 | 20.0 | 11.2 |
| | Ingredient (D) (mass %) | Dicyclopentenyl oxyethyl acrylate | 21.9 | 23.0 | 21.8 | 25.1 | 19.4 | 21.9 |
| | | Dicyclopentenyl acrylate | 17.8 | 18.7 | 17.7 | 20.4 | 15.8 | 17.8 |

TABLE 1-continued

|  |  | Name of ingredient | | | | | |
|---|---|---|---|---|---|---|---|
|  | Other ingredients (mass %) | N-vinyl caprolactam | 11.2 | 11.2 | 11.2 | 11.2 | 11.2 | 11.2 |
|  | Total amount |  | 100.0 | 100.0 | 100.0 | 100.0 | 100.0 | 100.0 |
| Additives | (E) Photopolymerization initiator (parts by mass) | IRGACURE 819 | 5.0 | 5.0 | 5.0 | 5.0 | 5.0 | 3.0 |
|  | (F) Photopolymerization initiator (parts by mass) | DAROCUR TPO | 4.0 | 4.0 | 4.0 | 4.0 | 4.0 | 3.0 |
|  | (G) Photosensitizer (parts by mass) | DETX | 1.0 | 1.0 | 1.0 | 1.0 | 1.0 | 1.0 |
|  | Slipping agent (parts by mass) | BYK-UV 3500 | 0.2 | 0.2 | 0.2 | 0.2 | 0.2 | 0.2 |
|  | Polymerization inhibitor (parts by mass) | p-methoxyphenol | 0.15 | 0.15 | 0.15 | 0.15 | 0.15 | 0.15 |
|  | Pigment (parts by mass) | IRGALITE BLUE GLVO | 2.5 | 2.5 | 2.5 | 2.5 | 2.5 | 2.5 |
|  | Dispersant (parts by mass) | Solsperse 36000 | 0.2 | 0.2 | 0.2 | 0.2 | 0.2 | 0.2 |
| Evaluation results | Curability | PVC film | B | C | B | C | B | C |
|  | Degree of elongation at which cracks etc. appear (%) | PVC film | C | B | C | A | C | B |
|  | Elongation durability | PVC film | B | A | B | A | B | A |
|  | Resistance to abrasion | PVC film | 1 | 3 | 1 | 3 | 1 | 0 |
|  | Adhesiveness | PVC film | 0 | 2 | 0 | 2 | 2 | 2 |

|  |  | Name of ingredient | Example 7 | Example 8 | Example 9 | Example 10 | Example 11 | Example 12 |
|---|---|---|---|---|---|---|---|---|
| Reaction component | Ingredient (A) (mass %) | Aminoacrylate | 4.6 | 10.0 | 4.6 | 4.6 | 4.6 | 4.6 |
|  | Ingredient (B) (mass %) | Phenoxyethyl acrylate | 33.3 | 30.8 | 20.0 | 50.0 | 33.3 | 8.0 |
|  | Ingredient (C) (mass %) | Tetraethylene glycol diacrylate | 11.2 | 11.2 | 11.2 | 11.2 | 11.2 | 11.2 |
|  | Ingredient (D) (mass %) | Dicyclopentenyl oxyethyl acrylate | 21.9 | 20.3 | 29.2 | 12.7 | 21.9 | 35.9 |
|  |  | Dicyclopentenyl acrylate | 17.8 | 16.5 | 23.8 | 10.3 | 17.8 | 29.1 |
|  | Other ingredients (mass %) | N-vinyl caprolactam | 11.2 | 11.2 | 11.2 | 11.2 | 11.2 | 11.2 |
|  | Total amount |  | 100.0 | 100.0 | 100.0 | 100.0 | 100.0 | 100.0 |
| Additives | (E) Photopolymerization initiator (parts by mass) | IRGACURE 819 | 7.0 | 5.0 | 7.0 | 7.0 | 8.0 | 7.0 |
|  | (F) Photopolymerization initiator (parts by mass) | DAROCUR TPO | 5.0 | 4.0 | 5.0 | 5.0 | 5.0 | 5.0 |
|  | (G) Photosensitizer (parts by mass) | DETX | 3.0 | 1.0 | 3.0 | 3.0 | 3.0 | 3.0 |
|  | Slipping agent (parts by mass) | BYK-UV 3500 | 0.2 | 0.2 | 0.2 | 0.2 | 0.2 | 0.2 |
|  | Polymerization inhibitor (parts by mass) | p-methoxyphenol | 0.15 | 0.15 | 0.15 | 0.15 | 0.15 | 0.15 |
|  | Pigment (parts by mass) | IRGALITE BLUE GLVO | 2.5 | 2.5 | 2.5 | 2.5 | 2.5 | 2.5 |
|  | Dispersant (parts by mass) | Solsperse 36000 | 0.2 | 0.2 | 0.2 | 0.2 | 0.2 | 0.2 |
| Evaluation results | Curability | PVC film | A | B | A | A | A | A |
|  | Degree of elongation at which cracks etc. appear (%) | PVC film | B | C | B | A | B | C |
|  | Elongation durability | PVC film | A | B | A | A | A | B |

TABLE 1-continued

| | | | | | | | |
|---|---|---|---|---|---|---|---|
| Resistance to abrasion | PVC film | 2 | 1 | 1 | 3 | 2 | 1 |
| Adhesiveness | PVC film | 0 | 0 | 0 | 0 | 0 | 0 |

TABLE 2

| | | Name of ingredient | Comparative Example 1 | Comparative Example 2 | Comparative Example 3 | Comparative Example 4 | Comparative Example 5 | Comparative Example 6 |
|---|---|---|---|---|---|---|---|---|
| Reaction component | Ingredient (A) (mass %) | Aminoacrylate | | 4.0 | 4.0 | 4.6 | 4.6 | 4.0 |
| | Ingredient (B) (mass %) | Phenoxyethyl acrylate | 35.4 | 38.7 | 25.0 | 33.3 | 33.3 | 35.3 |
| | Ingredient (C) (mass %) | Tetraethylene glycol diacrylate | 11.2 | | 30.0 | 11.2 | 11.2 | |
| | Ingredient (D) (mass %) | Dicyclopentenyl oxyethyl acrylate | 23.3 | 25.4 | 16.4 | 21.9 | 21.9 | 21.1 |
| | | Dicyclopentenyl acrylate | 18.9 | 20.7 | 13.4 | 17.8 | 17.8 | 17.2 |
| | Other ingredients (mass %) | N-vinyl caprolactam | 11.2 | 11.2 | 11.2 | 11.2 | 11.2 | 11.2 |
| | | Tripropylene glycol diacrylate | | | | | | 11.2 |
| | Total amount | | 100.0 | 100.0 | 100.0 | 100.0 | 100.0 | 100.0 |
| Additives | (E) Photopolymerization initiator (parts by mass) | IRGACURE 819 | 5.0 | 5.0 | 5.0 | 2.0 | 10.0 | 5.0 |
| | (F) Photopolymerization initiator (parts by mass) | DAROCUR TPO | 4.0 | 4.0 | 4.0 | 2.0 | 6.0 | 4.0 |
| | (G) Photosensitizer (parts by mass) | DETX | 1.0 | 1.0 | 1.0 | 0.5 | 3.0 | 1.0 |
| | Slipping agent (parts by mass) | BYK-UV 3500 | 0.2 | 0.2 | 0.2 | 0.2 | 0.2 | 0.2 |
| | Polymerization inhibitor (parts by mass) | p-methoxyphenol | 0.15 | 0.15 | 0.15 | 0.15 | 0.15 | 0.15 |
| | Pigment (parts by mass) | IRGALITE BLUE GLVO | 2.5 | 2.5 | 2.5 | 2.5 | 2.5 | 2.5 |
| | Dispersant (parts by mass) | Solsperse 36000 | 0.2 | 0.2 | 0.2 | 0.2 | 0.2 | 0.2 |
| Evaluation results | Curability | PVC film | D | D | A | D | Not evaluable | D |
| | Degree of elongation at which cracks etc. appear (%) | PVC film | B | AA | D | A | | B |
| | Elongation durability | PVC film | A | A | D | A | | A |
| | Resistance to abrasion | PVC film | 3 | 5 | 1 | 4 | | 4 |
| | Adhesiveness | PVC film | 2 | 2 | 4 | 0 | | 2 |

For the radiation-curable ink compositions according to Examples 1 to 12, which are presented in Table 1, the integrated light intensity required to get the surface of the recorded matter into the tack-free state was less than 400 mJ/cm$^2$ for all, conforming that these ink compositions were excellent in curability. Furthermore, the degree of elongation at which cracks etc. appeared was higher than 100%, demonstrating excellent flexibility. As for elongation durability, moreover, favorable results were obtained. Favorable results were also obtained for resistance to abrasion and adhesiveness.

On the other hand, for the radiation-curable ink composition according to Comparative Example 1, which is presented in Table 2, the integrated light intensity required to get the surface of the recorded matter into the tack-free state was not less than 400 mJ/cm$^2$ because it did not contain Ingredient (A) in its reaction component, and it was confirmed that this ink composition was not excellent in curability.

As for the radiation-curable ink composition according to Comparative Example 2, which is presented in Table 2, the integrated light intensity required to get the surface of the recorded matter into the tack-free state was not less than 400 mJ/cm$^2$ because it did not contain Ingredient (C) in its reaction component, and it was confirmed that this ink composition was not excellent in curability. Worse yet, with this ink composition, which did not contain Ingredient (C) in its reaction component, images that were excellent in flexibility and elongation durability but not in resistance to abrasion were recorded.

The radiation-curable ink composition according to Comparative Example 3, which is presented in Table 2, contained Ingredient (C) in its reaction component but at a content ratio of higher than 20 mass % and had some imbalance. With this ink composition, as a result, images that were excellent in resistance to abrasion but not in flexibility and elongation durability were recorded.

The radiation-curable ink composition according to Comparative Example 4, which is presented in Table 2, contained a photopolymerization initiator and a photosensitizer but at content ratios lower than those specified and had some imbalance. The integrated light intensity required to get the surface of the recorded matter into the tack-free state was not less than 400 mJ/cm$^2$, and it was confirmed that this ink composition was not excellent in curability. Accordingly, the abrasion resistance test also showed an unfavorable result.

The radiation-curable ink composition according to Comparative Example 5, which is presented in Table 2, contained a photopolymerization initiator and a photosensitizer but at content ratios higher than those specified and had some imbalance. In particular, Ingredient (E) was not completely dissolved in the reaction component; this ink composition could not be subjected to any of the evaluation tests.

As for the radiation-curable ink composition according to Comparative Example 6, which is presented in Table 2, tripropylene glycol diacrylate was used instead of Ingredient (C) in the reaction component. With the use of tripropylene glycol diacrylate, the integrated light intensity required to get the surface of the recorded matter into the tack-free state was not less than 400 mJ/cm², and no improvement of curability was observed. Furthermore, the abrasion resistance test also showed an unfavorable result.

The present invention is not limited to the embodiments described above; various modifications are allowed. For example, the present invention includes constitutions that are substantially the same as those described as the embodiments (e.g., ones that have the same function, are based on the same method, and provide the same results as those for the embodiments, or ones for the same purposes and advantages as those of the embodiments). Furthermore, the present invention includes constitutions obtained by changing any nonessential part(s) of those described as the embodiments. Moreover, the present invention includes constitutions that have the same operations and offer the same advantages as those described as the embodiments or that can achieve the same purposes as those described as the embodiments. Additionally, the present invention includes constitutions obtained by adding any known technology(ies) to those described as the embodiments.

REFERENCE NUMERALS

20 . . . ink jet recording apparatus, 30 . . . motor, 40 . . . platen, 50 . . . carriage, 52 . . . printing head (recording head), 54 . . . black ink cartridge, 56 . . . color ink cartridge, 60 . . . carriage motor, 62 . . . traction belt, 64 . . . guide rail, 80 . . . capping unit, 90A (190A) and 90B (190B) . . . active-radiation applicator, 192 and 193 . . . active-radiation light source, 194 . . . housing, 196 . . . ink layer, P . . . recording medium

The invention claimed is:

1. An ink jet recording method comprising:
   (a) a step of discharging a radiation-curable ink composition comprising:
      (A) aminoacrylate in the range of 1 mass % to 10 mass %, inclusive, in a reactive component;
      (B) phenoxyethyl acrylate in the range of 20 mass % to 50 mass %, inclusive, in the reactive component;
      (C) tetraethylene glycol diacrylate in the range of 1 mass % to 20 mass %, inclusive, in the reactive component;
      (E) bis(2,4,6-trimethylbenzoyl)-phenylphosphine oxide in the range of 3 parts by mass to 8 parts by mass, inclusive, in 100 parts by mass of the reaction component;
      (F) 2,4,6-trimethylbenzoyl-diphenyl-phosphine oxide in the range of 3 parts by mass to 5 parts by mass, inclusive, in 100 parts by mass of the reaction component; and
      (G) diethylthioxanthone in the range of 1 part by mass to 3 parts by mass, inclusive, in 100 parts by mass of the reaction component
   onto a recording medium and
   (b) a step of irradiating the discharged radiation-curable ink composition from an active-radiation light source comprising an LED or LD with active radiation of 300 to 1000 mJ/cm² and having a peak light-emission wavelength in the range of 350 nm to 400 nm, inclusive.

2. The ink jet recording method of claim 1, further comprising: (D) an alicyclic-structured monofunctional acrylate in the range of 20 mass % to 65 mass %, inclusive, in the reaction component.

3. The ink jet recording method of claim 1, wherein: (D) the alicyclic-structured monofunctional acrylate is selected from the group consisting of dicyclopentenyl acrylate, dicyclopentanyl acrylate, dicyclopentenyloxyethyl acrylate, and combinations thereof.

4. The ink jet recording method of claim 1, wherein: the viscosity at a measurement temperature of 20° C. is in the range of 10 mPa·s to 40 mPa·s, inclusive, and the surface tension at a measurement temperature of 20° C. is in the range of 20 mN/m to 30 mN/m, inclusive.

5. Recorded matter recorded by the ink jet recording method according to claim 1.

\* \* \* \* \*